US012713179B2

(12) United States Patent
Nongpiur et al.

(10) Patent No.: US 12,713,179 B2
(45) Date of Patent: Aug. 18, 2026

(54) PASSIVELY MEASURING ROOM REVERB

(71) Applicant: GOOGLE LLC, Mountain View, CA (US)

(72) Inventors: Rajeev Nongpiur, Mountain View, CA (US); Tianyu Xu, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 252 days.

(21) Appl. No.: 18/739,899

(22) Filed: Jun. 11, 2024

(65) Prior Publication Data

US 2025/0380083 A1 Dec. 11, 2025

(51) Int. Cl.
*H04R 1/32* (2006.01)
*H04R 17/02* (2006.01)

(52) U.S. Cl.
CPC ............. *H04R 1/326* (2013.01); *H04R 17/02* (2013.01); *H04R 2499/15* (2013.01)

(58) Field of Classification Search
CPC .... H04R 1/326; H04R 17/02; H04R 2499/11; H04R 2499/15; H04R 5/00; H04R 5/033; G01H 7/00; H04S 7/305; H04S 7/306; H04S 2400/15
USPC ...................................................... 381/56, 58
See application file for complete search history.

(56) References Cited

U.S. PATENT DOCUMENTS 12,283,265 B1 * 4/2025 Sumberg ................ G10K 15/02
2004/0213415 A1 * 10/2004 Rama ....................... G01H 7/00 381/63
2022/0060842 A1 2/2022 Tang et al.
2023/0276190 A1 * 8/2023 Bernard ................... G01H 7/00 381/63
2023/0283976 A1 * 9/2023 Ninan ...................... H04S 7/304 381/303
2024/0292149 A1 * 8/2024 Murgai .................. H04R 3/002
2024/0414492 A1 * 12/2024 Hertensteiner ..... G10L 21/0208

FOREIGN PATENT DOCUMENTS

WO 2022144493 A1 7/2022
WO 2023076823 A1 5/2023
WO WO-2025224115 A2 * 10/2025 ............. H04S 7/301

OTHER PUBLICATIONS

Markovic, et al., "Reverberation-Based Feature Extraction for Acoustic Scene Classification", ICASSP 2017; https://ieeexplore.ieee.org/document/7952262, Mar. 5-9, 2017, pp. 781-785.

* cited by examiner

*Primary Examiner* — Ahmad F. Matar
*Assistant Examiner* — Sabrina Diaz
(74) *Attorney, Agent, or Firm* — Brake Hughes Bellermann LLP

(57) ABSTRACT

Disclosed implementations for determining a reverb characteristic of an environment. An audio signal capturing an amount of sound emitted from a source within an environment over a period of time is received from an audio sensor. A reverb parameter measuring a decrease in the sound over the period of time and a measure of the amount of sound that includes background noise in the environment are determined. The reverb characteristic of the environment is determined based on the reverb parameter and the measure. Spatial audio then rendered based on the reverb characteristic.

27 Claims, 8 Drawing Sheets

PASSIVELY MEASURING ROOM REVERB

BACKGROUND

Sound reproduction is the process of recording, processing, storing, and recreating sound, such as speech, music, and the like. When recording a sound, one or more audio sensors are used to capture sound in single or multiple positions for a recording device.

SUMMARY

A reverb characteristic is a measure of how sound travels and decays within an environment such as a room. Once determined, a reverb characteristic can be used to emulate or render sounds in the environment. Current approaches for measuring the reverb characteristic of an environment include projecting and recording audio (e.g., a sine sweep or white noise) or computations based on information identified using vision and depth sensors. At least one technical problem with these approaches is that such approaches are expensive and not feasible with typical user computing devices.

The implementations described herein provide at least one technical solution to these technical problems by determining a reverb characteristic based on naturally occurring sound events (e.g., ambient sounds) within an environment that are recorded passively by a user device as a user interacts with and otherwise uses the user device in the environment. In one example implementation, the user device is configured to collect sound data (e.g., an audio signal) and determine a reverb characteristic by measuring a decrease in the sound emitted from a source of the sound over a period of time. This measure is then weighted according to a background noise level to generate or update the reverb characteristic for the environment.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

Accordingly, in one example, a method includes receiving, from an audio sensor, an audio signal capturing an amount of sound emitted from a source within an environment over a period of time; determining a reverb parameter measuring a decrease in the sound over the period of time; determining a measure of the amount of sound that includes background noise in the environment; determining a reverb characteristic of the environment based on the reverb parameter and the measure; and rendering a spatial audio based on the reverb characteristic.

The details of one or more implementations of the present disclosure are set forth in the accompanying drawings and the description below. Other features and advantages of the present disclosure will be apparent from the description and drawings, and from the claims.

BRIEF DESCRIPTION OF THE DRAWINGS

The following detailed description that sets forth aspects of the subject matter, along with the accompanying drawings of which.

DETAILED DESCRIPTION

Figure 1:
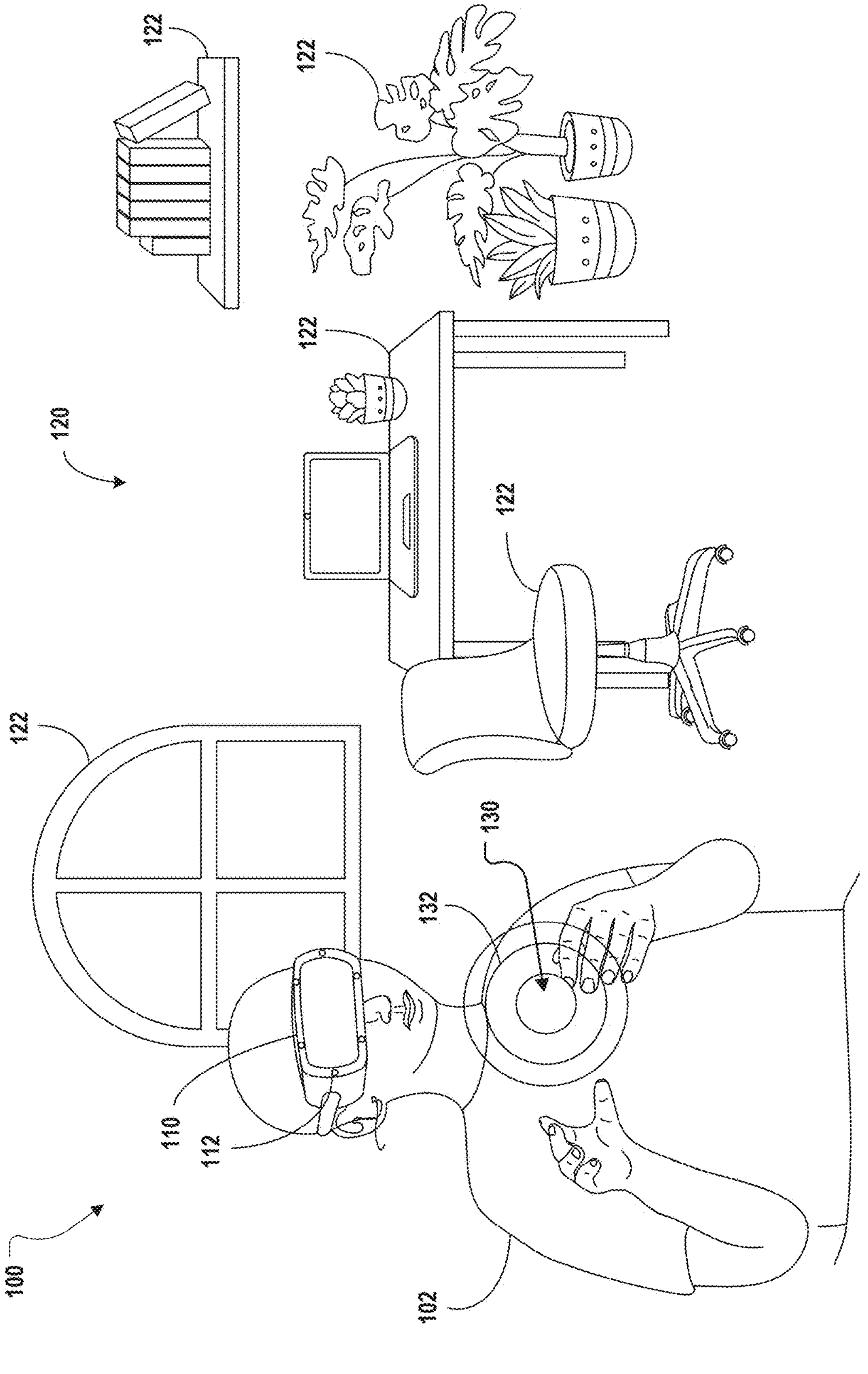
FIG. 1 is an example environment where a device can be employed to determine a reverb characteristic of the environment.

Environments (e.g., a room, a cubicle, a chamber, an alcove, a court, an entrance, a passage, and the like) come in many shapes and sizes, and each of these spaces sound completely different. Structural elements, such as flat, parallel, and reflective boundaries, as well the objects within the room, cause sonic anomalies such as modal interference, standing waves, flutter echo, rings, and resonances. Moreover, because sound consists of pressure waves (sound waves), sound bounces around an environment. Like all waves, sound waves have peaks (compression) and valleys (rarefaction). The oscillations between compression and rarefaction move through a media (gaseous, liquid, or solid) to produce mechanical energy referred to herein as sound. The number of compression/rarefaction cycles in a given period determines the frequency of a sound wave. The intensity of sound is measured in Pascals and the pressure in decibels.

Within a particular environment, sound waves can bounce off the floor, walls, ceiling, and any other reflective surface, gradually losing energy over time. Reverberation is the collection of these reflected sounds while reverberation time is the time, after the source of the sound has ceased, for the sound to fade away. Accordingly, a reverb characteristic is a measure of this reverberation (e.g., a measure of how sound travels and decays within the environment) that is calculated according to the reverberation time. The reverb characteristic can be used to emulate/render sounds in a particular environment.

Current approaches for measuring a reverb characteristic of an environment include projecting, via a device (e.g., a loudspeaker or a microphone), a sine sweep or white noise and deriving a series of reverb parameters to form the reverb characteristic. At least one technical problem with this approach is that such an approach is not feasible for many types of user devices because the loudspeakers and audio sensors (e.g., microphones) associated with such devices are typically not loud enough or sensitive enough to capture the reverb effects. Another current approach includes computing the reverb parameters based on the dimensions and reflection coefficients of an environment identified using vision and depth sensors. However, at least one technical problem with such an approach are inaccuracies in the calculated reverb parameters. Moreover, the scanning of a space with a device takes a considerable amount of time and is not user-friendly as generating the reverb parameters via a model takes a multitude of user scans of the environment.

The implementations described herein provide at least one technical solution to these technical problems. In particular, implementations of the described system and techniques determine a reverb characteristic of an environment based on sound events that naturally occur within the environment (e.g., ambient sounds) and are recorded passively by a user device (e.g., via audio sensors associated with the user device). The reverb characteristic of the environment can be used to, for example, render spatial audio. Generally, spatial audio adds an extra dimension of height to traditional stereo sound, which is delivered through two channels (left and right). Spatial audio also differs from surround sound where sounds appear to the listener as coming from directional speakers. Instead, with spatial audio, filmmakers, sound designers, and music creatives can precisely place individual sounds anywhere around the environment (e.g., a room) to create an immersive soundscape. The result is a spatial sound experience that fills up the environment and places the listener inside the entertainment where sounds appear to emanate from different places, just as they do in a natural setting.

As used herein, passive recording includes collecting sound events (e.g., sound emitting from a source) via, for example, audio sensors associated with a user device while the device is in use or a passive recording setting without providing prompts to user (e.g., play a sound, walk around a room, and the like) and according to permissions granted by the user as well as the security settings of the device. Put another way, a user device that is configured to passively record collects audio data as a user uses the device within an environment in a manner that is transparent to the user and according to the permissions granted by the user.

In some implementations, a reverb characteristic of an environment (or a specific location in the environment) is determined based on sounds recorded on a device as a user uses a user device within the environment. The device can be a computing device. In some implementations, the user device is configured to receive sound data (e.g., an audio signal) from an audio sensor (e.g., a microphone) and determine a reverb characteristic of an environment by determining a reverb parameter for the range of frequencies included in the sound data.

In some cases, the reverb parameter includes a measure of a decrease in the sound (i.e., the wave energy) emitted from a source of the sound over a period of time. In some implementations, the user device is configured to determine a measure of the background noise included in the audio signal and generate (or update) the reverb characteristic by weighting the reverb parameter according to the amount of sound captured in the audio signal (e.g., within a range or sub-band of frequencies) measured above the background noise.

FIG. 1 shows an example environment 100 (e.g., a room) where a device 110 (e.g., a headset) having one or more audio sensors 112 (e.g., a microphone) is employed (e.g., by a user 102) to determine a reverb characteristic (e.g., including at least one reverb parameter, such as RT20 or RT60) of the environment 100. The device 110 can be configured to determine a reverb characteristic of the environment 100 from audio signals (e.g., sound data) of sound events passively recorded as the user 102 interacts with the environment 100. These sound events may include both the ambient sounds that occur naturally in the environment 100 as well as sounds generated by the user 102. For example, the device 110 may passively record audio data as the user 102 prepares a meal in the environment 100 or record the sounds generated by interaction among the various features 122 in the room that are reverberated based on the structural elements 120 of the environment 100. In one example scenario, when the user 102 interacts with a virtual representation of the environment 100 (e.g., provided by the device 110), the reverb characteristic can be used to render audio such that the user 102 perceives the generated sounds as if generated by sources with the environment 100.

As depicted, the environment 100 includes features 122 and structural elements 120 (e.g., walls, floors, ceilings). FIG. 1 depicts the example environment 100 with one or more features 122 (e.g., a table books, a window, a chair, flowers, and/or the like); however, implementations of the present disclosure can be realized within an environment having any number of features as well as any configuration of the respective structural elements 120. Generally, implementations of the present disclosure can be realized with sound having a decibel level about a configurable threshold above the background noise for the space where the sound originates, or the environment being measured.

The device 110 is sustainably similar to computing device 810 depicted below with reference to FIG. 8. Moreover, in the figures and descriptions included herein, device 110 is a mixed reality (XR) device such as an augmented reality (AR) and/or virtual reality (VR) device; however, it is contemplated that implementations of the present disclosure can be realized with any of the appropriate computing device(s), such as the user computing devices 602, 604, 606, and 608 described below with reference to FIG. 6.

The audio sensors 112 are devices that are configured to detect sounds and convert the detected sounds into an electrical audio signal. In some implementations, the audio sensors 112 are configured to generate a signal that includes a range of frequencies (e.g., temporal frequencies) captured from a recorded sound event and the interaction of the respective sound waves in the environment 100. Example audio sensors include, but are not limited to, microphones, piezoelectric sensors, and capacitive sensors. In some implementations, the audio sensors 112 are configured to capture/record samples from the sound waves 132 generated from the source 130 of a sound event. These sound waves 132 may be captured by the audio sensors 112 directly from the source 130 or indirectly after having been reflected by one of the features 122 or structural elements 120. In some implementations, the audio sensors 112 are configured to generate a series of audio signals based on the samples.

As depicted in FIG. 1, sound events from a source 130 that occur within the environment 100 (e.g., sound generated as the user 102 interacts with the environment 100) are recorded by the audio sensors 112. The sound events may be generated directly by the user (e.g., the user interacting with the environment), but they may also occur without an interaction by the user (e.g., another person, an animal, or other objects may interact with the environment to create the sound events).

In some implementations, the device 110 is configured to employ the systems and techniques described herein to determine a reverb characteristic of the environment 100 based on the audio signals provided by the audio sensors 112. In some implementations, the device 110 employs a model (e.g., a neural network) trained to determine the sub-band reverb level, specifically the sub-band reverberation time (RT)-60, based on the characteristics of recorded audio signal. In some cases, the device 110 may be configured to provide the recorded audio signal via a communication network to a back-end system (such as the back-end system 630 described below with reference to FIG. 6), which is configured to process the audio signal through the trained model and provide the determined reverb characteristic to the device 110.

In some implementations, a measure of the background noise included in the audio signal is determined and the reverb characteristic generated or updated by weighting the reverb parameter according to the amount of energy captured in the audio signal measured above the background noise. In some implementations, the estimated reverb characteristic is continuously updated (e.g., as the user 102 uses the device 110 in the environment 100) thus ensuring that rendered spatial audio adapts to changes over time in reverb levels of the environment.

Example Architecture

Figure 2:
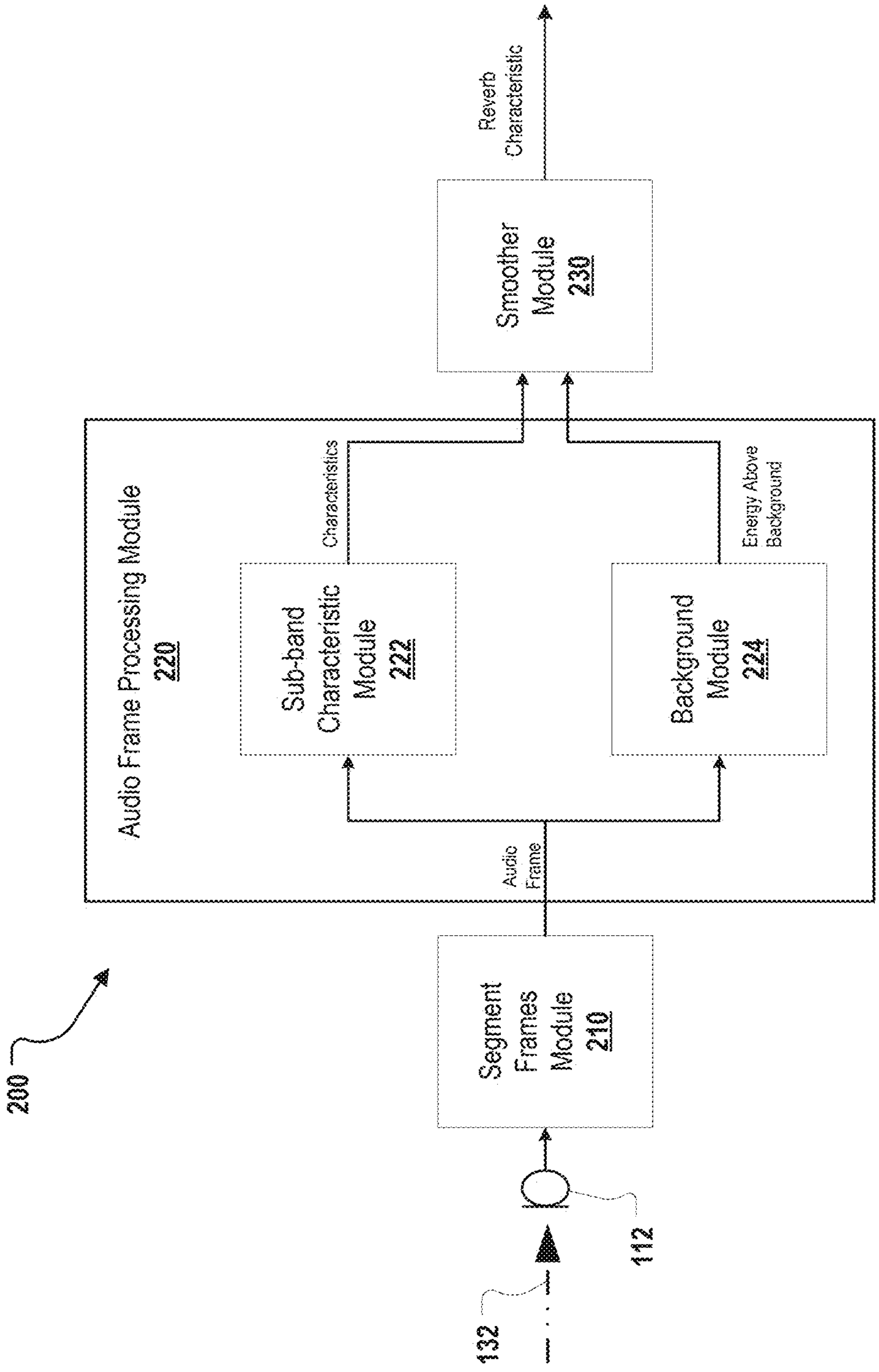
FIG. 2 is an example architecture that can be employed to execute example implementations of the present disclosure.

FIG. 2 is an example architecture 200 for the described reverb measuring system. As depicted, the example architecture 200 includes the audio sensor 112, segment frames module 210, audio frame processing module 220, and smoother module 230. The audio frame processing module 220 includes sub-band characteristic module 222 and background module 224. In some implementations, the modules 210, 220, 222, 224, and 230 are executed via an electronic processor of the device 110, depicted with reference to FIG. 1. In some implementations, the modules 210, 220, 222, 224, and 230 are provided via a back-end system (such as the back-end system 630 described below with reference to FIG. 6) and the device 110 is configured to communicate with the back-end system via a network (such as the communications network 610 described below with reference to FIG. 6).

Generally, the example architecture 200 can be used to determine a reverb characteristic (also referred to herein as a series of reverb parameters) for the environment 100 based on the audio signal (e.g., a time domain signal) provided by the audio sensor 112. As described above, the reverb characteristic is a measure of the decay of a sound within the environment 100 where the signal was recorded and can be defined according to a series of reverb parameters (RT-20, RT-60, RT-90, and the like) that are determined for the bands of frequencies captured in the audio signal. In some cases, a single reverberation time (e.g., RT-60) may be determined for the entire range of frequencies included in the audio signal. In other cases, the range of frequencies included in the audio signal is divided into a series of sub-bands and a reverberation time (or sub-bands reverberation time) is determined for each of the sub-bands of frequencies.

In some implementations, the segment frames module 210 divides the recorded audio signal provided by the audio sensor 112 into audio-input frames or (also referred to herein as audio frames) based on a set interval (e.g., between Ims to 1 second). In some cases, the interval is set based on the type of output (e.g., RT-20, RT-60, RT-90) or how the determined reverb characteristic for the environment is to be employed (e.g., certain use cases, such as a professional recording, may require finer granularity than other use cases). Each audio frame is provided to the audio frame processing module 220 (i.e., the sub-band characteristic module 222 and the background module 224).

In some implementations, the segment frames module 210 is configured to divide the recorded audio signal with an overlap between audio frames. For example, the segment frames module 210 may be configured to overlap the audio signal between adjacent audio frames by a set amount (e.g., between 5% to 50%). Again, the amount of overlap may be set based on the type of output or how the determined reverb characteristic for the environment is to be employed.

The audio frame processing module 220 includes modules (e.g., the sub-band characteristic module 222 and the background module 224) configured to process each frame and determine information (e.g., reverberation time) related to the reverb characteristic of the environment 100. For example, the sub-band characteristic module 222 determines, based on the audio frame, a series of sub-band reverb parameters (e.g., an RT-60 for each sub-band of frequencies) that are used to form a reverb characteristic of the environment 100. In some implementations, the sub-band characteristic module 222 employs a trained model (e.g., a neural network) to determine the sub-band reverb parameters. In some implementations, the reverb characteristic is determined for the band of frequencies (full band) included in the audio frame (e.g., between 20 hertz (Hz) to 20 kilohertz (kHz)). In other implementations, the band of frequencies in the audio frame is divided into a series of sub bands and a reverb characteristic is determined for each of the sub bands (also referred to herein as a sub-band reverb parameter) or for a number of the sub bands within a set frequency range (e.g., the sub-bands that include the frequencies between 200 kHz and 2 kHz).

For example, the trained model may divide the audio frame into the series of sub-bands by performing a frequency decomposition (e.g., extracting the frequency components of the audio frame). In some cases, for example, such a frequency decomposition includes a Fast Fourier Transform (FFT) of the audio frame. An FFT is an algorithm that computes the Discrete Fourier Transform (DFT) of a sequence (e.g., the audio frame), or its inverse (IDFT). Fourier analysis converts a signal (e.g., the audio frame) from its original domain (often time or space) to a representation in the frequency domain and vice versa. In some cases, the audio frame may be divided into the series of sub-bands via a separate module (not shown) that performs the FFT on the audio frame, which is provided to the trained model.

In some cases, the band of frequencies in the signal may be divided uniformly into sub bands where each sub band has the same bandwidth of frequency range (e.g., 1 hz, 2 hz, 3 hz, and so forth up to about 5 kHz) or from, for example, three to one hundred plus sub bands. In other cases, the band of frequencies in the signal may be divided by scaling the bandwidth of frequency range in each sub band according to a set metric (e.g., human hearing). For example, human hearing can discern more information at lower frequencies. Accordingly, the lower frequency sub bands may include a smaller range of frequency, which is increased for each sub band according to a set metric (e.g., 1 hz) as the frequency climbs. In some implementations, the band of frequencies is divided into a number of frequency bins (e.g., 128) and each sub band is assigned as set number of frequency bins (e.g., 4 bin) or a scale number of frequency bins based on the frequency (e.g., lower frequency bands are assigned 1-2 bins which scale up to 12 to 16 bins for the higher frequency bands).

In some implementations, the trained model provides a multi-banned vector with a calculated reverb parameter (e.g., an RT-60) for each frequency sub-band as output to the smoother module 230. In some implementations, the trained model is a neural network and the neural network is trained to identify type and directions of various sounds recorded in the signal and use only certain sounds or types or sounds from a particular direction (e.g., indicating that the sound emanated from an actual person in the environment 100 and not from, for example, a television or speaker where a reverb character has been integrated in the projected sound). In some implementations, the model provides a source metric (e.g., a weighted value) with each calculated reverb parameter. The source metric reflects a determination by the model for the source of the information in the particular frequency sub-band of the audio frame. For example, the model may be trained to provide a higher confidence score the more likely that the sub-band includes sounds that emanated from a person as opposed to a speaker. The description of FIG. 6 below provides additional information regarding how the model may be trained and what type of sounds the model may be trained to use to determine output.

Figure 3:
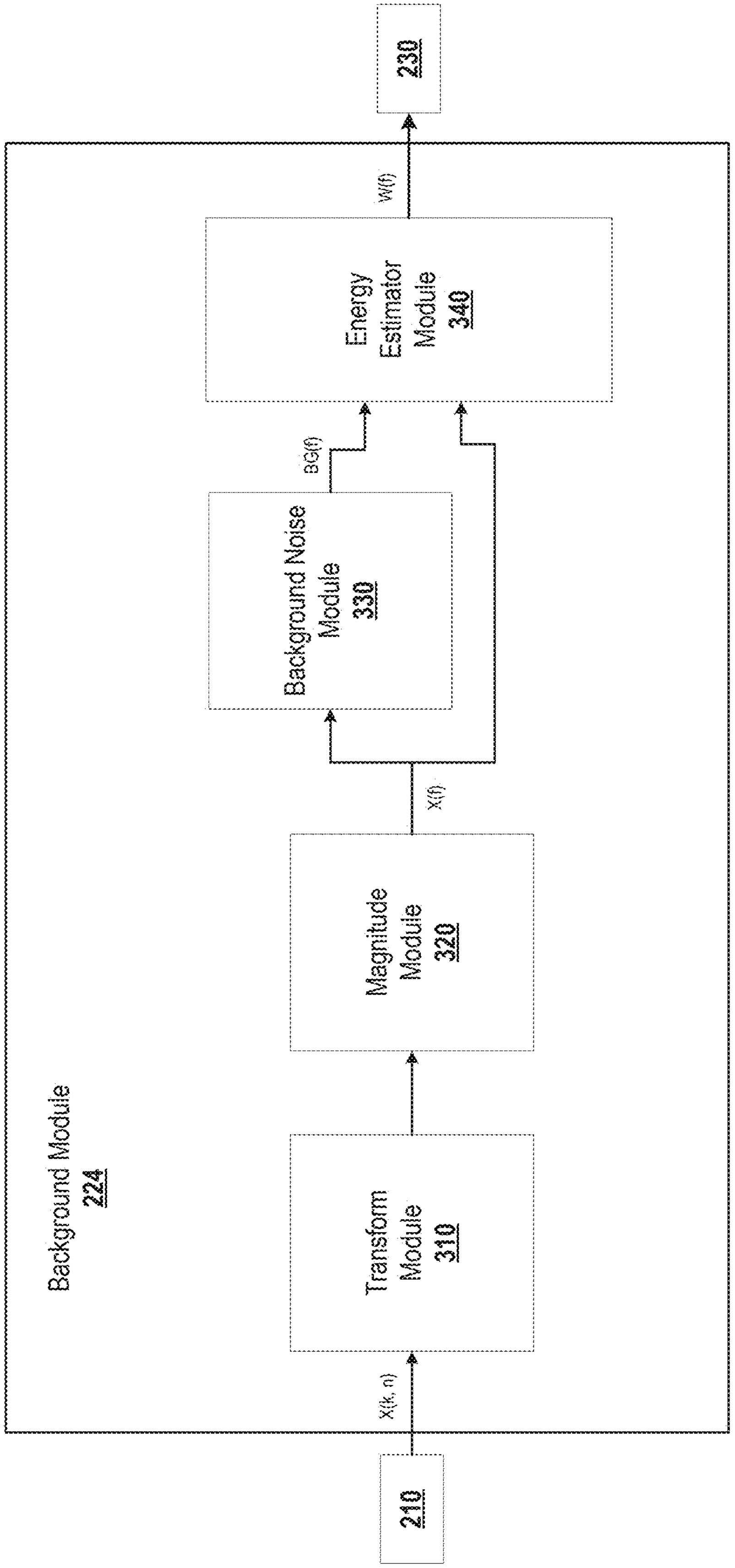
FIG. 3 is an example architecture for an example implementation of the background module of FIG. 2.

In some implementations, the background module 224 determines an amount of energy above a background noise level for each sub-band in the audio frame. FIG. 3 is an example architecture for an embodiment of the background module 224. As depicted, the background module 224 includes transform module 310, magnitude module 320, background noise module 330, and energy estimator module 340.

In some implementations, the transform module 310 divides the audio frame into the series of sub-bands (similar to the description of the trained model above) by performing a frequency decomposition (an FFT) on the audio frame. Similar to the description of the trained model above, the band of frequencies may be divided uniformly or scaled based on the FFT. In some implementations, the transform module 310 and the model (or module that feeds the sub-bands to the model) are configured/trained to divide the band of frequencies in the same way. Put another way, the sub-band reverb parameters (e.g., RT-60) are mapped to the same sub-bands of frequencies as the output (e.g., a metric for the energy above a background noise level) provided by the background module 224. The magnitude module 320 determines a log magnitude of the FFT for each sub-band provided by the transform module 310.

The background noise module 330 processes the log magnitude of the FFT to determine a level of background noise for the respective sub-band of frequencies. Example methods that may be employed by the background noise module 330 to determine the background noise for the respective sub-band of frequencies include, but are not limited to, thresholding, spectral subtraction, Wiener filtering, and deep neural networks (DNNs). In some examples, thresholding includes setting a threshold level for the amplitude of the sub-band of frequencies in the audio frame where sounds below the threshold are considered noise. In some examples, spectral subtraction includes estimating a noise spectrum by analyzing silent portions of the sub-band of frequencies in the audio frame and then subtracting these silent portions from the overall spectrum. In some examples, wiener filtering employs an adaptive filter to estimate the noise spectrum, which is subtracted from the sub-band of frequencies in the audio frame. In some examples, DNNs are trained to identify and remove background noise in various situations. DNNs are typically trained with large datasets, provide high accuracy, and can handle complex noise patterns.

The energy estimator module 340 receives the log magnitude of the FFT, X(f), and level of background noise, BG(f), for the respective sub-bands and determines the energy above background, W(f), for each of the frequency sub-bands. In some implementations, the energy estimator module 340 determines the energy above background (i.e., the background noise) for each sub-band according to: $W(f)=\max\ [X(f)-BG(f),0]$. The background module 224 provides the level of background noise for each of the sub-bands to the smoother module 230.

Returning to FIG. 2, the smoother module 230 uses the multi-banned vector (the reverb parameter for each frequency sub-band) and the energy above background for each frequency sub-band determined for each frame to update (or generate when the first audio frame for the environment 100 is received) the reverb characteristic for the environment 100 (or a particular area in the environment 100). In some implementations, the audio frame includes location information related to the device 110, the audio sensors 112, or the user 102. For example, the device 110 may include an inertial measurement unit (IMU) sensor or imaging sensor (e.g., a camera) that is configured to capture location information while the audio signal is captured by the audio sensors 112.

In some implementations, the energy above background for each frequency sub-band is used as a confidence metric (e.g., a weighted value) for the respective reverb parameter for the frequency sub-band when updating the reverb characteristic as the higher energy the amount of energy above the background for the frequency sub-band, the more weight the parameter (e.g., the RT-60 value) generated by the trained model is given.

Figure 4:
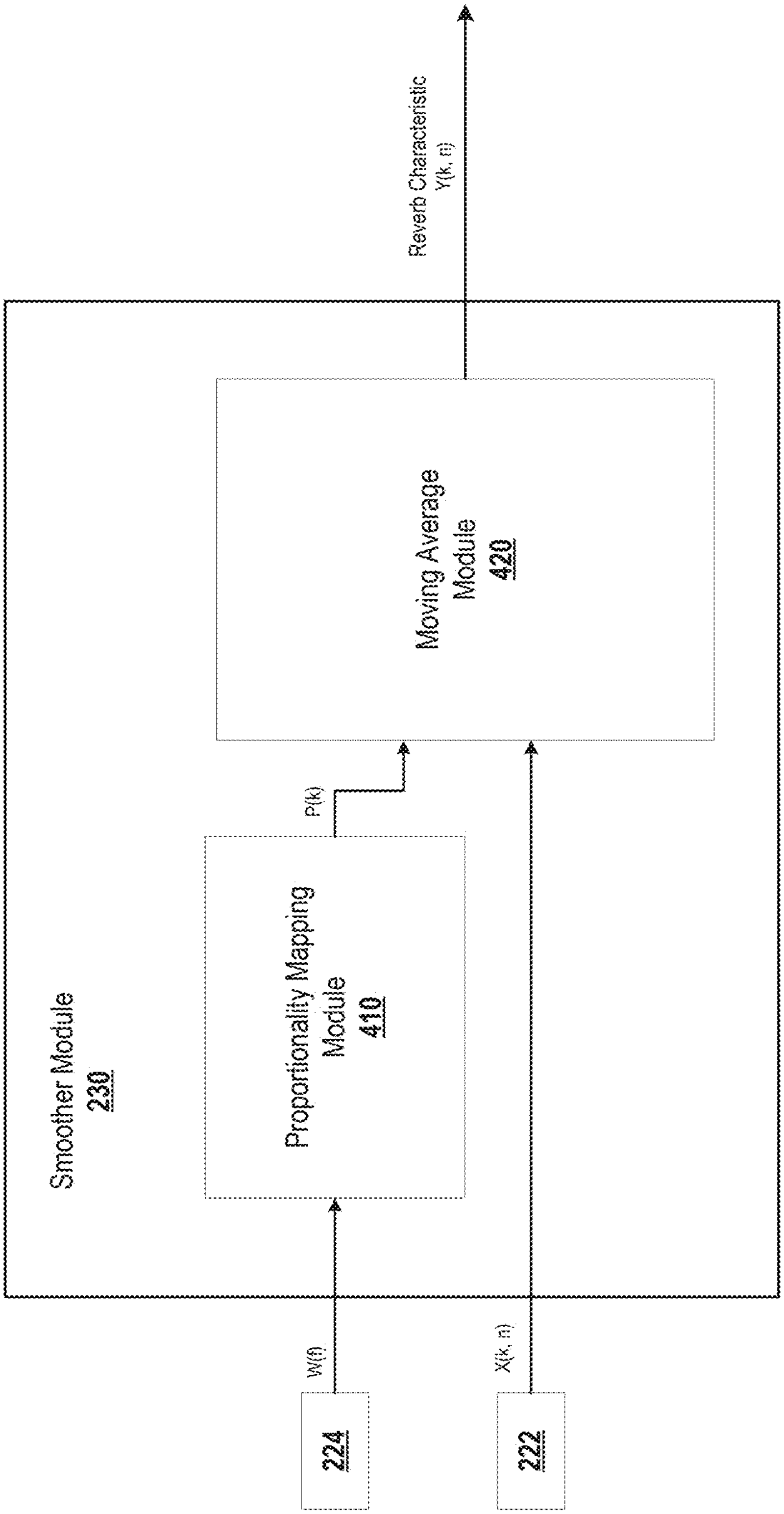
FIG. 4 is an example architecture for an example implementation of the reverb characteristic smoother module of FIG. 2.

FIG. 4 is an example architecture for an embodiment of the smoother module 230. As depicted, the smoother module 230 includes proportionality mapping module 410 and moving average module 420. The proportionality mapping module 410 maps the energy above background, W(f), for each of the frequency sub-bands to a 'smoothing' parameter of an exponential moving average, P(k), where f corresponds to the FFT frequencies and k corresponds to the sub-band frequencies (e.g., Mel bands). In some cases, the proportionality mapping module 410 determines the exponential moving average according to: $P(k)=f\_map(W(f))$, where f_map is the mapping function. In some cases, the value for P(k) is between 0 and 1. In some cases, the number of FFT frequencies is greater or equal to the number of sub-band frequencies. For example, the number of FFT frequency bins can be 257 while the number of sub-bands can be 12. Other numbers of bin and sub-bands may also be employed based on the output parameters.

In some implementations, the mapping function is tuned such that the frequency parameter for the frequency sub-band is weighted more heavily, when updating the respective frequency of the reverb characteristics of the environment 100, as the higher the amount of energy above background provided in the frequency sub-band. In some implementations, the mapping function is tuned to weight the frequency parameter for the frequency sub-band according to the source metric provided by the trained model (see above) when smoothing the respective frequency sub-band in the reverb characteristic for the environment. Put another way, for each audio frame, the mapping function may use both the confidence metric and/or the source metric to determine a weighted value for updating a particular frequency sub-band of the reverb characteristics of the environment 100 with the respective frequency parameter (e.g., RT-60) for the frequency sub-band that is provided by the sub-band characteristic module 222 (e.g., the output of the trained model).

For a sub-band k, the moving average module 420 applies the exponential moving average, P(k), to the respective frequency parameter for the frequency sub-band, X(k, n), to update the reverb characteristics of the environment 100. In some cases, the reverb characteristics of the environment 100 is maintained as a moving average represented as: Y(k, n). In some cases, the moving average is updated according to: $Y(k, n)=[1-P(k)]Y(k, n-1)+P(k)X(k, n)$, where $X(k, n)$ is the RT-60 estimate for sub-band k and frame n, $Y(k, n)$ is the resulting sub-band estimate for sub-band k and frame n, and $P(k)$ is the smoothing parameter for sub-band k. In some implementations, the smoother module 230 maintains a moving average, $Y(k, n)$, for the reverb characteristic of the environment 100, which is updated in real-time as the acoustics of the environment 100 (or area in the environment 100) change.

In some implementations, the smoother module 230 maintains a moving average for each defined area in the environment 100. In some cases, these defined areas may be measured down to a few square feet, centimeter or even smaller based on the configuration of the described reverb measuring system. The system may be configured to provide audio within each defined area of the environment 100 (e.g., as the user 102 moves through the environment 100) according to the respective reverb characteristic that is maintained by the smoother module 230 according to the location data provided with the audio signal.

Training the Model

Figure 5:
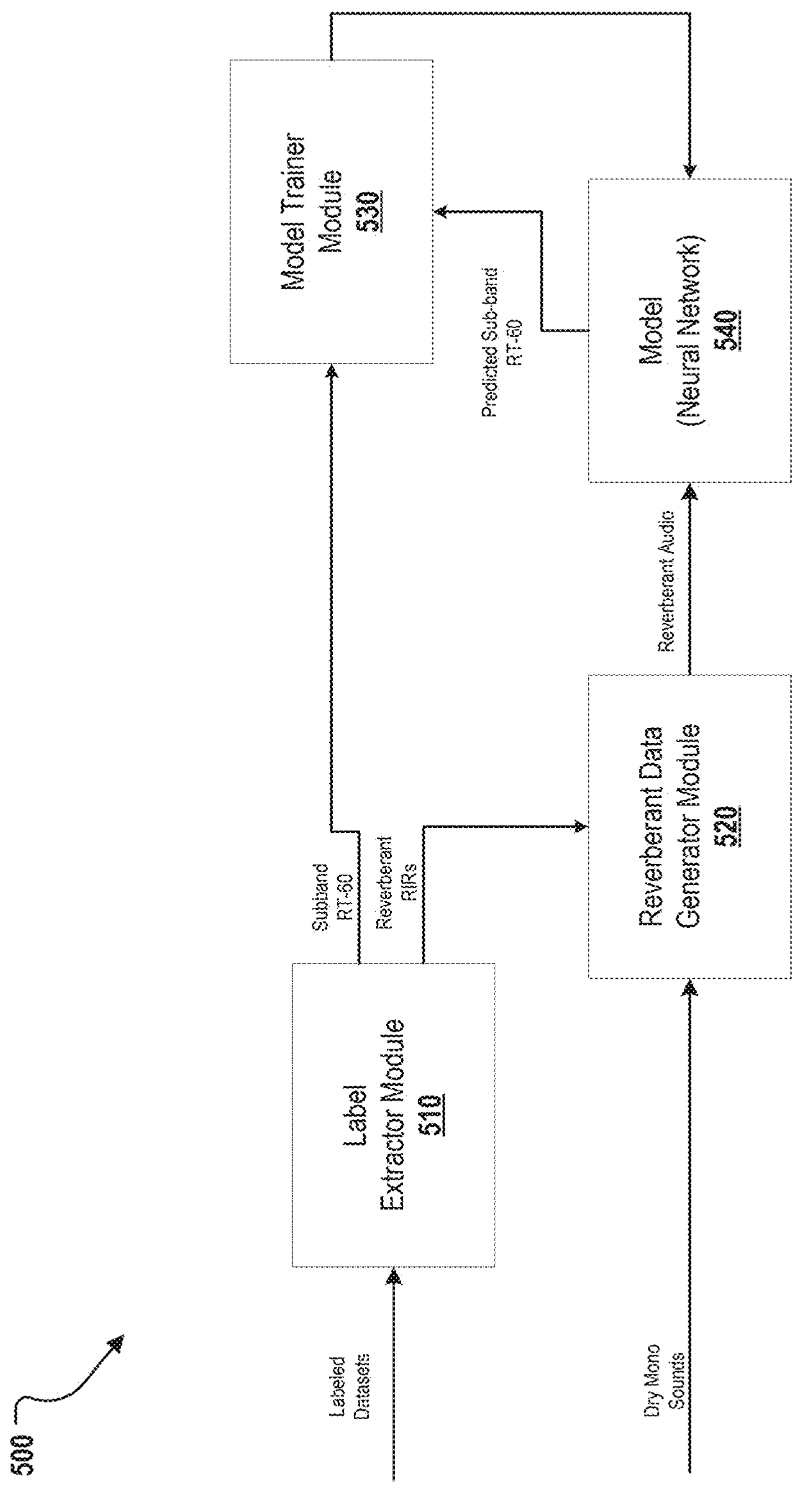
FIG. 5 is an example architecture for training a machine learning model to determine a reverb parameter based on an audio signal or audio frame.

FIG. 5 is an example architecture 500 for training a machine learning (e.g., a neural network) model, such as the trained model employed by the sub-band characteristic module 222, to determine a sub-band reverb parameter (e.g., an RT-60) based on an audio signal or audio frame. In some implementations, the model is trained to ignore sounds with reverb characteristics already calculated (e.g., sounds that emanate from a speaker) and use sounds (via a confidence vector) based on the location of the source of the sound. For example, in some cases, a model is trained to use sounds that emanate in a cone below microphone as these sounds have a high probability of coming from a user (e.g., the user 102) interacting with his or her environment (e.g., the environment 100) as opposed to emanating from a speaker. In some cases, the model is trained to determine the direction and source location based on the levels (energy) in the audio signal when received by one or more audio sensors (e.g., the one or more audio sensors 112). In some implementations, the model is trained to provide a source metric with each calculated reverb parameter, such as described above with reference to FIG. 2.

The example architecture 500 includes label extractor module 510, reverberant data generator module 520, model trainer module 530, and model 540. In some implementations, the modules 510, 520, and 530 are executed via an electronic processor of the device 110, depicted with reference to FIG. 1. In some implementations, the modules 510, 520, and 530 are provided via a back-end system (such as the back-end system 630 described below with reference to FIG. 6) and the device 110 is configured to communicate with the back-end system via a network (such as the communications network 610 described below with reference to FIG. 6).

In some implementations, the label extractor module 510 receives a labeled dataset of room impulse responses (RIRs). In some examples, the RIRs are labeled with corresponding sub-band RT-60s to form the labeled RIR datasets. In some implementations, as depicted in FIG. 5, the labels RIR dataset are employed to train the machine learning (e.g., a neural network) model 540, employed by the sub-band characteristic module 222 described above with reference to FIG. 2, for reverberant mouth-to-headset transfer function (MDTF) or reverberant device-related transfer function (DRTF). Generally, the reverberant MDTF are used to generate reverberant headset-user speech while the reverberant DRTF are used to generate external sounds, such as external speech. In some implementations, the labeled RIR datasets are used to train a, such as the trained model (see the description of FIG. 6 below).

In some implementations, the label extractor module 510 processes the labeled RIR datasets and provides the reverberant RIRs to the reverberant data generator module 520 and the ground-truth RT-60 to the model trainer module 530. In some implementations, the reverberant data generator module 520 receives example dry mono sounds (a "dry" signal is the original or unaffected part of a recorded sound while a "wet" signal is the processed or affected part of the sound) that are convolved with the reverberant RIRs (e.g., multi-mic impulse responses) to generate the reverberant audio (e.g., reverberant multi-microphone signal).

The reverberant audio is fed to the model 540 and trained by the model trainer module 530. In some implementations, the model trainer module 530 employs the ground-truth RT-60, provided by the label extractor module 510, as the desired output during training of the model 540 such that the model is trained to predict the RT-60 values from sound events as described above with reference to FIGS. 2, 3, and 4.

Using example architecture 500, the described reverb measuring system can train multiple variants of the model 540 depending on the particular use case. For example, the model 540 can be trained to estimate a reverb parameter (e.g., RT-60) for a frequency sub-band several example approaches: 1) all sounds events emitted in the environment, 2) only headset-user speech, or 3) only sounds generated by the headset user (e.g., user speech, claps, knock, footsteps, and the like). One potential problem with using all sounds events, approach 1, is that the estimated reverb parameter can become inaccurate when sounds are generated by an electronic device (e.g., a speaker) where the room reverberations are already integrated within the sound. Therefore, in some scenarios where sounds from electronic devices are present, approaches 2 or 3 may be employed. In some examples, an advantage of approach 3 over approach 2 is the use of wide-band signals (e.g., claps and knocks), which would enable more accurate estimation of the reverb parameter in the high-frequency sub-bands. In some examples, to train a variant in approach 2, dry speech that is convolved with the RIRs of the reverberant MDTFs is used to train the model 540. In some examples, for approach 3, non-speech sounds (claps, footsteps, knocks, and the like) are included, which can be generated by the headset user, and the RIRs of reverberant DRTFs are selected to correspond to the possible directions of such sounds.

Example Environment

Figure 6:
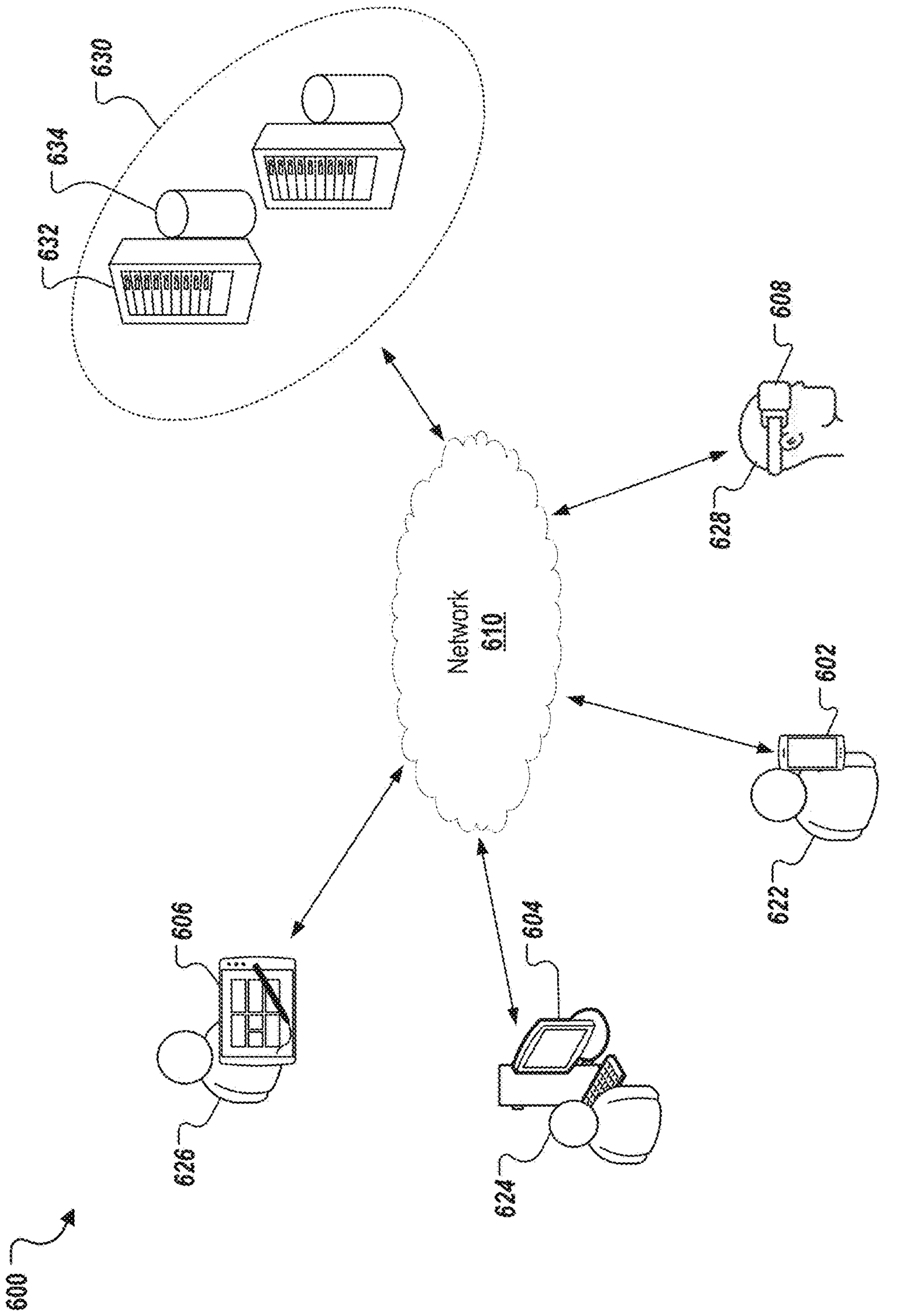
FIG. 6 is an example environment that can be employed to execute example implementations of the present disclosure.

FIG. 6 depicts an example environment 600 that can be employed to execute implementations of the present disclosure. The example environment 600 includes computing devices 602, 604, 606, 608; a back-end system 630, and a communications network 610. The communications network 610 may include wireless and wired portions. In some cases, the communications network 610 is implemented using one or more existing networks, for example, a cellular network, the Internet, a land mobile radio (LMR) network, a BLUETOOTH network, a wireless local area network (for example, Wi-Fi), a wireless accessory Personal Area Network (PAN), a Machine-to-machine (M2M) network, and a telephone network. The communications network 610 may also include future developed networks. In some implementations, the communications network 610 includes the Internet, an intranet, an extranet, or an intranet and/or extranet that is in communication with the Internet. In some implementations, the communications network 610 includes a telecommunication or a data network.

In some implementations, the communications network 610 connects web sites, devices (e.g., the computing devices 602, 604, 606, and 608) and back-end systems (e.g., the back-end system 630). In some implementations, the communications network 610 can be accessed over a wired or a wireless communications link. For example, mobile computing devices (e.g., the smartphone device 602 and the tablet device 606), can use a cellular network to access the communications network 610.

In some examples, the users 622, 624, 626, and 628 interact with the system through a graphical user interface (GUI) (e.g., the user interface 825 described below with reference to FIG. 8) or client application that is installed and executing on their respective computing devices 602, 604, 606, or 608. In some examples, the computing devices 602, 604, 606, and 608 provide viewing data to screens with which the users 622, 624, 626, and 626, can interact. In some examples, the computing devices 602, 604, 606, and 608 provide audio signals recorded within an environment (e.g., the environment 100) to the back-end system 630, which is configured to determine a reverb characteristic for the environment according to implementations of the present disclosure. In some examples, the computing devices 602, 604, 606, and 608 are configured to determine a reverb characteristic for the environment according to implementations of the present disclosure.

In some implementations, the computing devices 602, 604, 606 and 608 are sustainably similar to the computing device 810 described below with reference to FIG. 8. The computing devices 602, 604, 606, and 608 may include (e.g., may each include) any appropriate type of computing device, such as a desktop computer, a laptop computer, a handheld computer, a tablet computer, a personal digital assistant (PDA), an AR/VR device, a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

Four user computing devices 602, 604, 606 and 608 are depicted in FIG. 6 for simplicity. In the depicted example environment 600, the computing device 602 is depicted as a smartphone, the computing device 604 is depicted as a tablet-computing device, the computing device 606 is depicted as a desktop computing device, and the computing device 608 is depicted as an AR/VR/XR device. It is contemplated, however, that implementations of the present disclosure can be realized with any of the appropriate computing devices, such as those mentioned previously. Moreover, implementations of the present disclosure can employ any number of devices.

In some implementations, the back-end system 630 includes at least one server device 632 and optionally, at least one data store 634. In some implementations, the server device 632 is sustainably similar to computing device 810 depicted below with reference to FIG. 8. In some implementations, the server device 632 is a server-class hardware type device. In some implementations, the back-end system 630 includes computer systems using clustered computers and components to function as a single pool of seamless resources when accessed through the communications network 610. For example, such implementations may be used in data center, cloud computing, storage area network (SAN), and network attached storage (NAS) applications. In some implementations, the back-end system 630 is deployed using a virtual machine(s).

In some implementations, the data store 634 is a repository for persistently storing and managing collections of data. Example data stores that may be employed within the described system include data repositories, such as a database as well as simpler store types, such as files, emails, and so forth. In some implementations, the data store 634 includes a database. In some implementations, a database is a series of bytes or an organized collection of data that is managed by a database management system (DBMS).

In some implementations, the back-end system 630 hosts one or more computer-implemented services provided by the described system with which users 622, 624, 626, and 626 can interact using the respective computing devices 602, 604, 606, and 608. For example, in some implementations, the back-end system 630 is configured to determine a reverb characteristic for an environment according to implementations of the present disclosure.

Example Process

Figure 7:
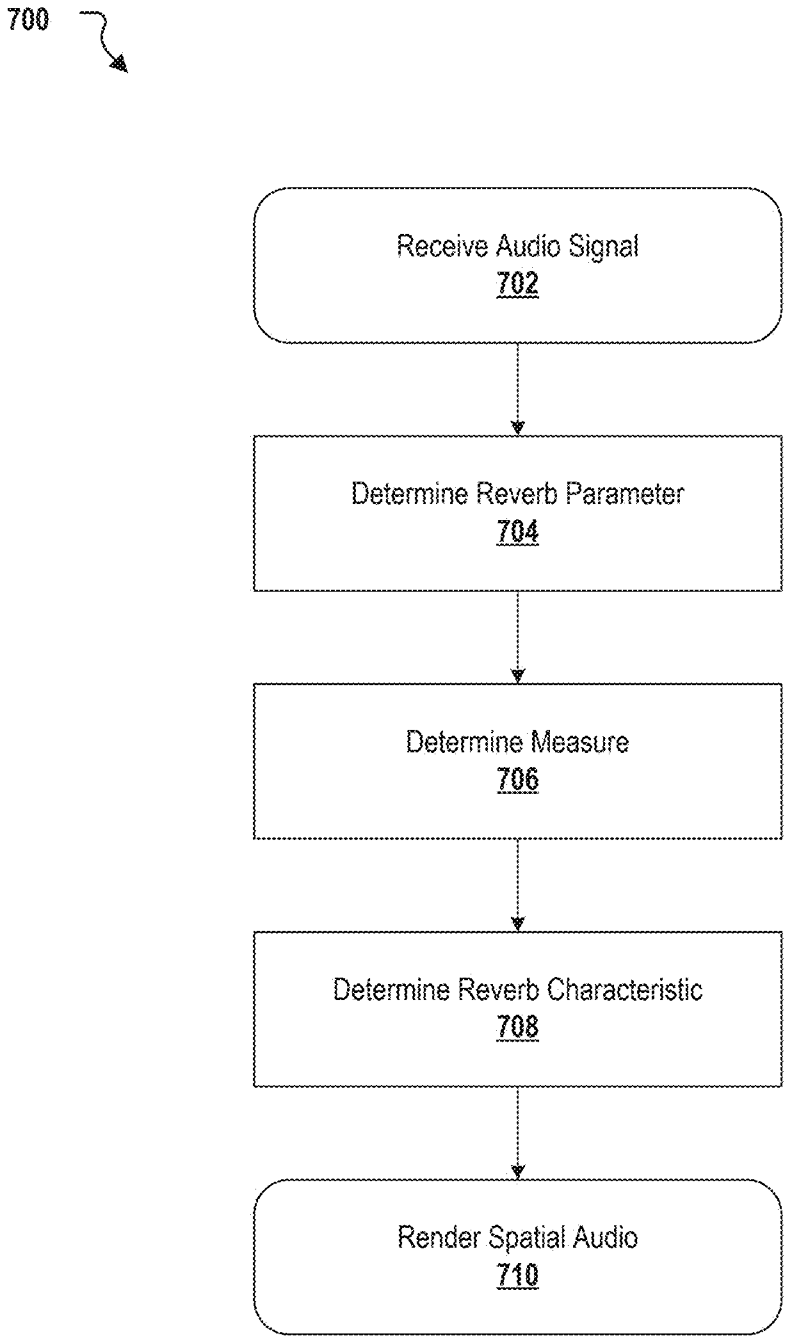
FIG. 7 is a flowchart of another non-limiting process that can be performed by example implementations of the present disclosure.

FIG. 7 depicts a flowchart of an example process 700 that can be implemented by implementations of the present disclosure. The example process 700 can be implemented by systems and components described with reference to FIGS. 1-6 and 8. The example process 700 generally shows in more detail how a reverb characteristic for an environment is determined based on an audio signal recorded within the environment.

For clarity of presentation, the description that follows generally describes the example process 700 in the context of FIGS. 1-6 and 8. However, it will be understood that the process 700 may be performed, for example, by any other suitable system, environment, software, and hardware, or a combination of systems, environments, software, and hardware as appropriate. In some implementations, various operations of the process 700 can be run in parallel, in combination, in loops, or in any order.

At 702, an audio signal capturing an amount of sound emitted from a source within an environment over a period of time is received from an audio sensor. In some implementations, the audio sensor comprises a microphone, a piezoelectric sensor, or a capacitive sensor.

From 702, the process 700 proceeds to 704 where a reverb parameter measuring a decrease in the sound over the period of time is determined. In some implementations, the amount of sound is within a range of frequencies. In some implementations, a frequency decomposition is performed to divide the range of frequencies into a plurality of sub-bands. In some implementations, the reverb parameter is determined for each sub-band of the plurality of sub-bands. In some implementations, the frequency decomposition includes a Fast Fourier Transform of the range of frequencies. In some implementations, the measure is determined based on a log magnitude of frequency decomposition.

In some implementations, the audio signal is divided into a plurality of audio frames based on an interval of time. In some implementations, the plurality of audio frames overlap by a set amount of time. In some implementations, the reverb parameter is determined for each audio frame of the plurality of audio frames. In some implementations, the reverb parameter includes a reverberation time—60 value or a reverberation time—20 value.

From 704, the process 700 proceeds to 706 where a measure of the amount of sound that includes background noise in the environment is determined.

From 706, the process 700 proceeds to 708 where a reverb characteristic of the environment is determined based on the reverb parameter and the measure. In some implementations, location data associated with the audio sensor is received from an IMU sensor or imaging sensor. In some implementations, the reverb characteristic of the environment is associated with the location data.

In some implementations, the reverb characteristic of the environment is determined by weighting the reverb parameter according to the measure as a weighted reverb parameter. In some implementations, the weighting of the reverb parameter is determined according to the amount of the sound that is above the measure. In some implementations, the reverb characteristic of the environment is determined by applying the weighted reverb parameter to a previously determined reverb characteristic of the environment. In some implementations, the reverb characteristic of the environment includes a moving average of weighted reverb parameters.

In some implementations, a source metric indicating a likelihood that a different reverb characteristic was applied to the sound emitted from the source is determined. In some implementations, the reverb characteristic of the environment is determined by weighting the reverb parameter according to the source metric as a weighted reverb parameter. In some implementations, the reverb characteristic of the environment comprises a measure of how sound travels and decays within the environment.

From 708, the process 700 proceeds to 710 where a spatial audio is rendered based on the reverb characteristic. In some implementations, the spatial audio is rendered based on the location data and the reverb characteristic of the environment. In some implementations, the spatial audio is rendered via at least one speaker based on the reverb characteristic. From 710, the process 700 ends.

Example System

Figure 8:
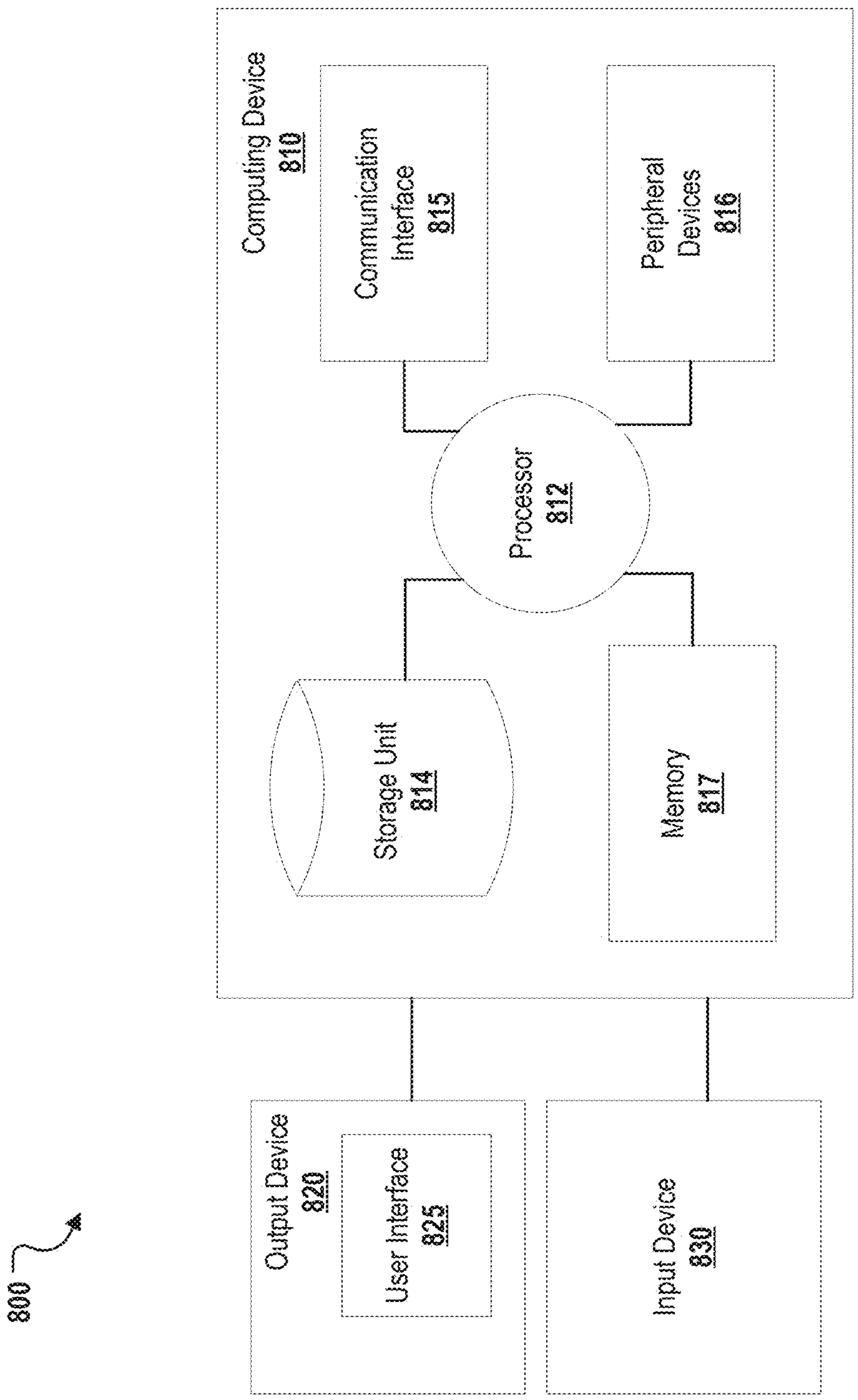
FIG. 8 is an example system that includes a computer or computing device that can be programmed or otherwise configured to implement systems or methods of the present disclosure.

FIG. 8 depicts an example computing system 800 that includes a computer or computing device 810 that can be programmed or otherwise configured to implement systems or methods of the present disclosure. For example, the computing device 810 can be programmed or otherwise configured to implement the process 700. In some cases, the computing device 810 includes an operating system configured to perform executable instructions. The operating system is, for example, software, including programs and data that manages the device's hardware and provides services for execution of applications.

In the depicted implementation, the computer or computing device 810 includes an electronic processor (also "processor" and "computer processor" herein) 812, such as a central processing unit (CPU) or a graphics processing unit (GPU), which is optionally a single core, a multi core processor, or a plurality of processors for parallel processing. The depicted implementation also includes memory 817 (e.g., random-access memory, read-only memory, flash memory), electronic storage unit 814 (e.g., hard disk or flash), communication interface module 815 (e.g., a network adapter or modem) for communicating with one or more other systems, and peripheral devices 816, such as cache, other memory, data storage, microphones, speakers, and the like.

In some implementations, the memory 817, storage unit 814, communication interface module 815 and peripheral devices 816 are in communication with the electronic processor 812 through a communication bus (shown as solid lines), such as a motherboard. In some implementations, the bus of the computing device 810 includes multiple buses. The above-described hardware components of the computing device 810 can be used to facilitate, for example, an operating system and operations of one or more applications executed via the operating system. For example, a reverb characteristic of an environment may be maintained and used to provide audio to a user via a connected audio device. In some implementations, the computing device 810 includes more or fewer components than those illustrated in FIG. 8 and performs functions other than those described herein.

In some implementations, the memory 817 and storage unit 814 include one or more physical apparatuses used to store data or programs on a temporary or permanent basis. In some implementations, the memory 817 is volatile memory and can use power to maintain stored information. In some implementations, the storage unit 814 is non-volatile memory and retains stored information when the computer is not powered. In further implementations, memory 817 or storage unit 814 is a combination of devices such as those disclosed herein. In some implementations, memory 817 or storage unit 814 is distributed across multiple machines such as a network-based memory or memory in multiple machines performing the operations of the computing device 810.

In some cases, the storage unit 814 is a data storage unit or data store for storing data. In some instances, the storage unit 814 stores files, such as drivers, libraries, and saved programs. In some implementations, the storage unit 814 stores data received by the device (e.g., audio data). In some implementations, the computing device 810 includes one or more additional data storage units that are external, such as located on a remote server that is in communication through a network (e.g., the communications network 610 described above with reference to FIG. 6).

In some implementations, platforms, systems, media, and methods as described herein are implemented by way of machine or computer executable code stored on an electronic storage location (e.g., non-transitory computer readable storage media) of the computing device 810, such as, for example, on the memory 817 or the storage unit 814. In further implementations, a computer readable storage medium is optionally removable from a computer. Non-limiting examples of a computer readable storage medium include compact disc read-only memories (CD-ROMs), digital versatile discs (DVDs), flash memory devices, solid state memory, magnetic disk drives, magnetic tape drives, optical disk drives, cloud computing systems and services, and the like. In some cases, the computer executable code is permanently, substantially permanently, semi-permanently, or non-transitorily encoded on the media.

In some implementations, the electronic processor 812 is configured to execute the code. In some implementations, the machine executable or machine-readable code is provided in the form of software. In some examples, during use, the code is executed by the electronic processor 812. In some cases, the code is retrieved from the storage unit 814 and stored on the memory 817 for ready access by the electronic processor 812. In some situations, the storage unit 814 is precluded, and machine-executable instructions are stored on the memory 817.

In some cases, the electronic processor 812 is a component of a circuit, such as an integrated circuit. One or more other components of the computing device 810 can be optionally included in the circuit. In some cases, the circuit is an application specific integrated circuit (ASIC) or a field programmable gate arrays (FPGAs). In some cases, the operations of the electronic processor 812 can be distributed across multiple machines (where individual machines can have one or more processors) that can be coupled directly or across a network.

In some cases, the computing device 810 is optionally operatively coupled to a communication network, such as the communications network 610 described above with reference to FIG. 6, via the communication interface module 815, which may include digital signal processing circuitry. Communication interface module 815 may provide for communications under various modes or protocols, such as global system for mobile (GSM) voice calls, short message/messaging service (SMS), enhanced messaging service (EMS), or multimedia messaging service (MMS) messaging, code-division multiple access (CDMA), time division multiple access (TDMA), frequency division multiple access (FDMA), orthogonal frequency-division multiple access (OFDMA), wideband code division multiple access (WCDMA), or general packet radio service (GPRS), among others. Such communication may occur, for example, through a transceiver. In addition, short-range communication may occur, such as using a BLUETOOTH, WI-FI, or other such transceiver.

In some cases, the computing device 810 includes or is in communication with one or more output devices 820. In some cases, the output device 820 includes a display to send visual or audio information to a user. In some cases, the output device 820 is a touch sensitive display that combines a display with a touch sensitive element that is operable to sense touch inputs as and functions as both the output device 820 and the input device 830. In still further cases, the output device 820 is a combination of devices such as those disclosed herein. In some cases, the output device 820 displays a user interface 825 generated by the computing device.

In some cases, the computing device 810 includes or is in communication with one or more input devices 830 that are configured to receive information from a user. In some cases, the input device 830 is a keyboard. In some cases, the input device 830 is a keypad (e.g., a telephone-based keypad). In some cases, the input device 830 is a cursor-control device including, by way of non-limiting examples, a mouse, trackball, trackpad, joystick, game controller, or stylus. In some cases, as described above, the input device 830 is a touchscreen or a multi-touchscreen. In other cases, the input device 830 is a microphone to capture voice or other sound input. In other cases, the input device 830 is an imaging device such as a camera. In still further cases, the input device is a combination of devices such as those disclosed herein.

It should also be noted that a plurality of hardware and software-based devices, as well as a plurality of different structural components may be used to implement the described examples. In addition, implementations may include hardware, software, and electronic components or modules that, for purposes of discussion, may be illustrated and described as if most of the components were implemented solely in hardware. In some implementations, the electronic-based aspects of the disclosure may be implemented in software (e.g., stored on non-transitory computer-readable medium) executable by one or more processors, such as electronic processor 812. As such, it should be noted that a plurality of hardware and software-based devices, as well as a plurality of different structural components may be employed to implement various implementations.

It should also be understood that although certain drawings illustrate hardware and software located within particular devices, these depictions are for illustrative purposes only. In some implementations, the illustrated components may be combined or divided into separate software, firmware, or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Moreover, various implementations of the systems and techniques described herein can be realized in digital electronic circuitry, integrated circuitry, specially designed ASICs (application specific integrated circuits), computer hardware, firmware, software, or combinations thereof. These various implementations can include implementation in one or more computer programs that are executable or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include computer readable or machine instructions for a programmable electronic processor and can be implemented in a high-level procedural or object-oriented programming language, or in assembly/machine language. As used herein, the terms "machine-readable medium" and "computer-readable medium" refers to any computer program product, apparatus or device (e.g., magnetic discs, optical disks, memory, Programmable Logic Devices (PLDs)) used to provide machine instructions or data to a programmable processor, including a machine-readable medium that receives machine instructions as a machine-readable signal. The term "machine-readable signal" refers to any signal used to provide machine instructions or data to a programmable processor.

The functionality of the computer readable instructions may be combined or distributed as desired in various environments. In some implementations, a computer program includes one sequence of instructions. In some implementations, a computer program includes a plurality of sequences of instructions. In some implementations, a computer program is provided from one location. In other implementations, a computer program is provided from a plurality of locations. In various implementations, a computer program includes one or more software modules. In various implementations, a computer program includes, in part or in whole, one or more web applications, one or more mobile applications, one or more standalone applications, one or more web browser plug-ins, extensions, add-ins, or add-ons, or combinations thereof.

Unless otherwise defined, the technical terms used herein have the same meaning as commonly understood by one of ordinary skill in the art to which the present subject matter belongs. As used in this specification and the appended claims, the singular forms "a," "an," and "the" include plural references unless the context clearly dictates otherwise. Any reference to "or" herein is intended to encompass "and/or" unless otherwise stated.

As used herein, the term "real-time" refers to transmitting or processing data without intentional delay given the processing limitations of a system, the time required to accurately obtain data and images, and the rate of change of the data and images. In some examples, "real-time" is used to describe the presentation of information obtained from components of embodiments of the present disclosure.

A number of implementations have been described. Nevertheless, it will be understood that various modifications may be made without departing from the spirit and scope of the disclosed implementations. While preferred implementations of the present disclosure have been shown and described herein, it will be obvious to those skilled in the art that such implementations are provided by way of example only. Numerous variations, changes, and substitutions will now occur to those skilled in the art without departing from the described system. It should be understood that various alternatives to the implementations described herein may be employed in practicing the described system.

Moreover, the separation or integration of various system modules and components in the implementations described earlier should not be understood as requiring such separation or integration in all implementations, and it should be understood that the described components and systems can generally be integrated together in a single product or packaged into multiple products. Accordingly, the earlier description of example implementations does not define or constrain this disclosure. Other changes, substitutions, and alterations are also possible without departing from the spirit and scope of this disclosure.

What is claimed is:

1. A non-transitory computer readable medium having stored thereon executable instructions that, when executed by an electronic processor, cause the electronic processor to perform operations comprising:

receiving, from an audio sensor, an audio signal capturing an amount of sound emitted from a source within an environment over a period of time;

determining a reverb parameter measuring a decrease in the sound over the period of time;

determining a measure of the amount of sound that includes background noise in the environment;

determining a reverb characteristic of the environment based on the reverb parameter and the measure; and rendering spatial audio based on the reverb characteristic.

2. The medium of claim 1, the operations further comprising:

receiving location data associated with the audio sensor; and associating the reverb characteristic of the environment with the location data.

3. The medium of claim 2, the operations further comprising:

rendering the spatial audio based on the location data and the reverb characteristic of the environment.

4. The medium of claim 1, the operations further comprising:

rendering the spatial audio via at least one speaker based on the reverb characteristic.

5. The medium of claim 1, wherein the reverb characteristic of the environment is determined by weighting the reverb parameter according to the measure as a weighted reverb parameter.

6. The medium of claim 5, wherein the weighting of the reverb parameter is determined according to the amount of the sound that is above the measure.

7. The medium of claim 5, wherein the reverb characteristic of the environment is determined by applying the weighted reverb parameter to a previously determined reverb characteristic of the environment.

8. The medium of claim 7, wherein the reverb characteristic of the environment includes a moving average of weighted reverb parameters.

9. The medium of claim 1, wherein the amount of sound is within a range of frequencies, the operations further comprising:

performing a frequency decomposition to divide the range of frequencies into a plurality of sub-bands; and determining the reverb parameter for the plurality of sub-bands.

10. The medium of claim 9, wherein the frequency decomposition includes a Fast Fourier Transform of the range of frequencies.

11. The medium of claim 9, wherein the measure is determined based on a log magnitude of frequency decomposition.

12. The medium of claim 1, the operations further comprising:

dividing the audio signal into a plurality of audio frames based on an interval of time.

13. The medium of claim 12, wherein the plurality of audio frames overlap by a set amount of time.

14. The medium of claim 12, the operations further comprising:

determining the reverb parameter for the plurality of audio frames.

15. The medium of claim 1, the operations further comprising:

determining a source metric indicating a likelihood that a different reverb characteristic was applied to the sound emitted from the source.

16. The medium of claim 15, wherein the reverb characteristic of the environment is determined by weighting the reverb parameter according to the source metric as a weighted reverb parameter.

17. The medium of claim 1, wherein the reverb characteristic of the environment comprises a measure of how sound travels and decays within the environment.

18. The medium of claim 1, wherein the audio sensor comprises a microphone, a piezoelectric sensor, or a capacitive sensor.

19. The medium of claim 1, wherein the reverb parameter includes a reverberation time-60 value or a reverberation time-20 value.

20. A method comprising:

receiving, from an audio sensor, an audio signal capturing an amount of sound emitted from a source within an environment over a period of time;

determining a reverb parameter measuring a decrease in the sound over the period of time;

determining a measure of the amount of sound that includes background noise in the environment;

determining a reverb characteristic of the environment based on the reverb parameter and the measure; and rendering spatial audio based on the reverb characteristic.

21. The method of claim 20, further comprising:

receiving location data associated with the audio sensor; and associating the reverb characteristic of the environment with the location data.

22. The method of claim 20, wherein the amount of sound is within a range of frequencies, the method further comprising:

performing a frequency decomposition to divide the range of frequencies into a plurality of sub-bands; and determining the reverb parameter for the plurality of sub-bands.

23. The method of claim 20, further comprising:

determining a source metric indicating a likelihood that a different reverb characteristic was applied to the sound emitted from the source, wherein the reverb characteristic of the environment is determined by weighting the reverb parameter according to the source metric as a weighted reverb parameter.

24. A system comprising:

an audio sensor;

at least one speaker; and an electronic processor coupled to the audio sensor and the at least one speaker, the electronic processor configured to perform operations comprising:

receiving, from the audio sensor, an audio signal capturing an amount of sound emitted from a source within an environment over a period of time;

determining a reverb parameter measuring a decrease in the sound over the period of time;

determining a measure of the amount of sound that includes background noise in the environment;

determining a reverb characteristic of the environment based on the reverb parameter and the measure; and rendering spatial audio via the at least one speaker based on the reverb characteristic.

25. The system of claim 24, wherein the operations further comprising:

receiving location data associated with the audio sensor; and associating the reverb characteristic of the environment with the location data.

26. The system of claim 24, wherein the amount of sound is within a range of frequencies, the operations further comprising:

performing a frequency decomposition to divide the range of frequencies into a plurality of sub-bands; and determining the reverb parameter for the plurality of sub-bands.

27. The system of claim 24, wherein the operations further comprising:

determining a source metric indicating a likelihood that a different reverb characteristic was applied to the sound emitted from the source, wherein the reverb characteristic of the environment is determined by weighting the reverb parameter according to the source metric as a weighted reverb parameter.

* * * * *